United States Patent [19]
Leinonen

[11] Patent Number: 5,836,231
[45] Date of Patent: Nov. 17, 1998

[54] RADIAL-PISTON HYDRAULIC MOTOR AND METHOD FOR REGULATION OF A RADIAL-PISTON HYDRAULIC MOTOR

[75] Inventor: Mauno Leinonen, Jyväskylä, Finland

[73] Assignee: Valmet Voimansiirto Oy, Jyväskylä, Finland

[21] Appl. No.: 586,914

[22] PCT Filed: May 16, 1995

[86] PCT No.: PCT/FI95/00256

§ 371 Date: May 23, 1996

§ 102(e) Date: May 23, 1996

[87] PCT Pub. No.: WO95/31641

PCT Pub. Date: Nov. 23, 1995

[30] Foreign Application Priority Data

May 18, 1994 [FI] Finland ................................. 942304

[51] Int. Cl.$^6$ ..................................................... F01B 1/06
[52] U.S. Cl. ............................................. 91/491; 91/519
[58] Field of Search ........................... 91/487, 486, 491, 91/492; 60/519, 983

[56] References Cited

U.S. PATENT DOCUMENTS

| | | | |
|---|---|---|---|
| 3,090,361 | 5/1963 | Orshansky, Jr. ........................ | 91/492 |
| 3,527,144 | 9/1970 | Firth et al. ............................. | 91/498 |
| 4,171,732 | 10/1979 | Pinson .................................... | 91/491 |
| 4,326,450 | 4/1982 | Bacquie .................................. | 91/487 |
| 4,398,450 | 8/1983 | Louhio .................................... | 91/477 |
| 4,724,742 | 2/1988 | Bigo et al. .............................. | 91/491 |
| 4,807,519 | 2/1989 | Wusthof et al. ........................ | 91/492 |

FOREIGN PATENT DOCUMENTS

| | | |
|---|---|---|
| 64840 | 2/1981 | Finland . |
| 340254 | 4/1971 | Sweden . |
| 1352514 | 5/1974 | United Kingdom . |
| 2097063 | 10/1982 | United Kingdom . |

Primary Examiner—Timothy Thorpe
Assistant Examiner—Cheryl J. Tyler
Attorney, Agent, or Firm—Steinberg & Raskin, P.C.

[57] ABSTRACT

A radial-piston hydraulic motor and method for regulating a radial-piston hydraulic motor including one or more cylinder groups, each cylinder group having piston mechanisms that move radially back and forth. The piston mechanisms include a piston and a press wheel. The volume per revolution of the motor can be changed in one or more stages so that the press wheels of one or more of the piston mechanisms come out of contact with a cam ring. The hydraulic motor also includes a closing valve for closing the flow of working pressure to one or more of the piston mechanisms.

12 Claims, 12 Drawing Sheets

RADIAL-PISTON HYDRAULIC MOTOR AND METHOD FOR REGULATION OF A RADIAL-PISTON HYDRAULIC MOTOR

FIELD OF THE INVENTION

The invention concerns a radial-piston hydraulic motor and a method for regulation of a radial-piston hydraulic motor.

BACKGROUND OF THE INVENTION

In the prior art, a number of axial-piston motor constructions are known, which operate at a high speed of rotation, and with these motors, a high torque is achieved exclusively by connecting the motor with a reduction gear at one or several stages. In the present patent application, a radial-piston motor construction will be described by whose means a high torque is achieved at low speeds of rotation. The construction also permits changing of the volume per revolution of the motor in one or several different stages. In this way, an exceptionally wide speed range is obtained by feeding a relatively little volumetric flow through the motor. A motor is provided which has a stepwise adjustable volume.

OBJECTS AND SUMMARY OF THE INVENTION

According to the invention, the radial hydraulic motor has been formed so that at least one of its piston mechanisms can be switched out of operation so as to change the volume per revolution of the motor and, thus, to regulate the speed of rotation and the torque. According to the invention, the equipment has been formed so that a separate valve, preferably a spindle valve, is used in a stationary stator part connected with a stationary shaft, which stator part contains the piston spaces of the piston mechanism. Thus, the valve is fitted in the stator part between the piston and the distributor valve that revolves as a rotor. By means of the valve, the pressurized medium is connected to the piston and, in a corresponding way, said fluid connection is closed in a situation in which said piston is switched out of operation.

The radial-piston hydraulic motor in accordance with the invention is mainly characterized in that the volume per revolution of the motor can be changed in one or several stages so that one or several piston mechanisms can be coupled into the interior of the cylinder group so that the press wheels of the piston mechanisms come out of contact with the cam ring, and that there is a closing valve by whose means the flow of the working pressure is connected to the piston mechanism connected with the closing valve, or the fluid flow to said mechanism is closed.

The method in accordance with the invention for regulation of a radial-piston hydraulic motor is mainly characterized in that, in the method, the fluid flow into at least one piston mechanism is closed and opened so that the closing valve is fitted in the cylinder frame of the piston mechanism, the flow of fluid into the piston mechanism connected with the closing valve being closed and opened by controlling the closing valve.

BRIEF DESCRIPTION OF THE DRAWINGS

In the following, the invention will be described with reference to some preferred embodiments of the invention illustrated in the figures in the accompanying drawings, the invention being, however, not supposed to be confined to said embodiments alone.

FIGS. 4A, 4B are enlarged views of the closing valve, which is fitted in the stationary cylinder frame between the piston and the distributor valve, i.e. distributor, revolving as a rotor. In FIG. 4A the closing valve is in the position in which the working pressure is passed through the closing valve into the piston space of the piston mechanism. FIG. 4B shows the closing valve in the position in which the control pressure has been passed to the closing valve and the access of the working pressure into the piston space has been closed.

DETAILED DESCRIPTION OF THE PREFERRED EMBODIMENTS

Figure 1A:
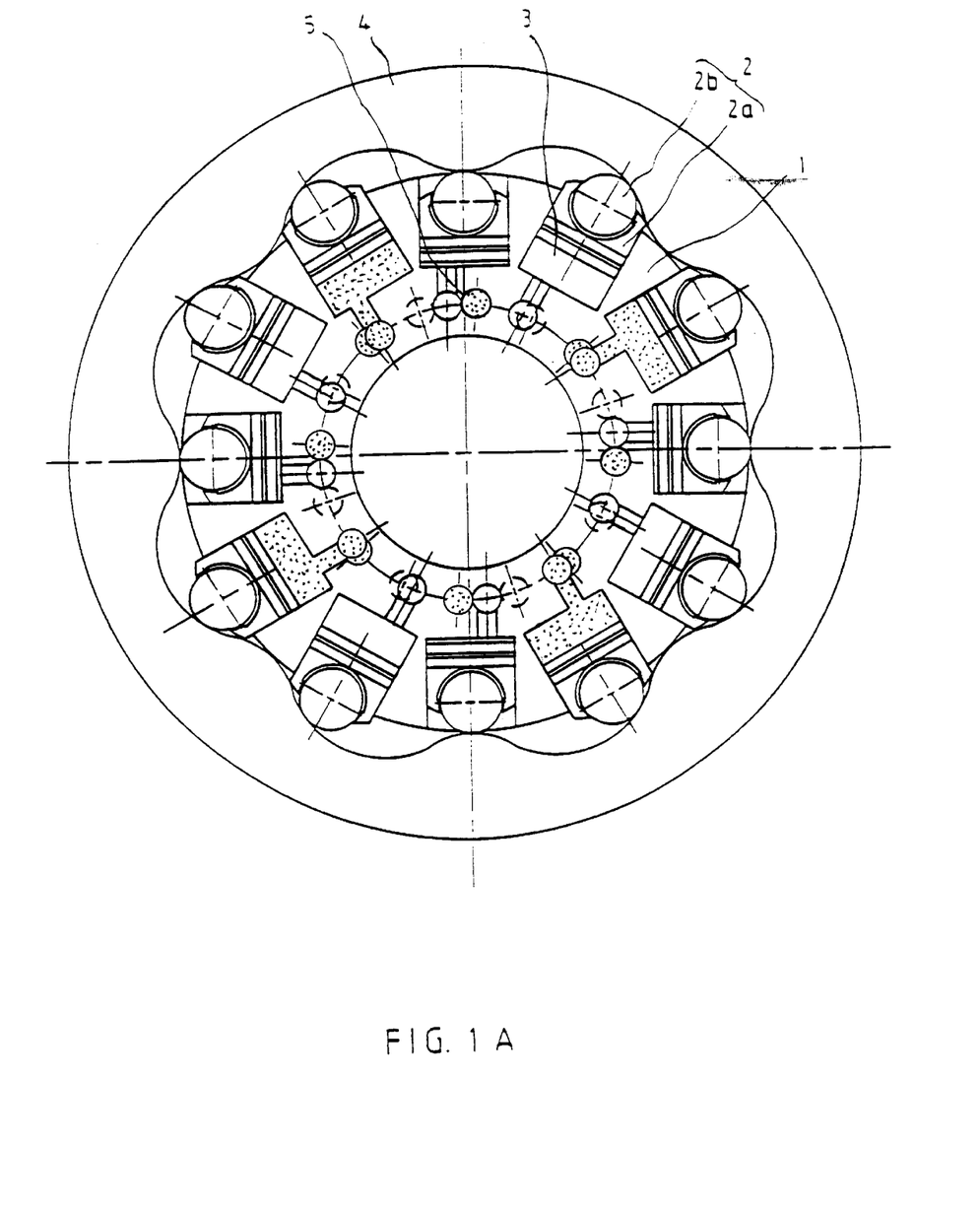
FIG. 1A is a schematic illustration of the operation of a radial-piston hydraulic motor.

FIG. 1 is a schematic illustration of the operation of an ordinary radial-piston hydraulic motor.

The radial-piston hydraulic motor comprises a cylinder group 1 placed in a stationary position. The cylinder group 1 includes a piston mechanism 2 that moves radially back and forth. The piston mechanism 2 comprises a piston 2a and a press wheel 2b. Into the piston space 3 of the piston mechanism 2, hydraulic fluid is passed so that the press wheels 2b of the pistons 2a that are in the power stage are pressed with force against the face of the wave-shaped cam ring 4, whereby the ring is brought into a revolving movement in relation to the cylinder group 1. $100a_2$ denotes the cylinder frame of the cylinder group 1. A distributor valve 5 is coupled with the cam ring 4 permanently, which distributor valve controls the pressurized fluid flow at the correct time into the piston space 3 of the piston mechanism 2 that is in the power stage. At the same time, the distributor valve 5 connects the piston spaces 3 of the piston mechanisms 2 that start their return movement to a lower pressure. The sense of rotation of the motor can be reversed by reversing the direction of the fluid flow through the distributor valve 5. The fluid flow is passed to the distributor valve 5 through a set of ducts 7 and 8 placed in the shaft 6, which is non-revolving in relation to the cylinder group 1 in the embodiments illustrated in the figures. Through the duct of higher pressure in the distributor valve 5, the working pressure is passed, for example, to two pistons that are in the power stage, while the two pistons that are in a so-called idling stage are then connected to the return flow duct, in which a lower pressure is present. In the embodiments shown in the figures, the central shaft 6 is non-revolving, and the box frame and the related distributor 5, i.e. the distributor valve, are rotated in relation to said shaft 6. The shaft 6 is connected with the non-revolving cylinder frame 100$a_2$. When a force acts upon the piston mechanisms and rotates the outside box frame 100$a_1$, at the same time the distributor, i.e. the distributor valve 5, is rotated and the duct openings present in the distributor are transferred, in the next stage, from the locations of the pistons in the power stage to the locations of the pistons in the idling stage, whereby these pistons enter into the power stage accordingly. Thus, there is a relative movement between the distributor and the cylinder frame, which is in face contact with said distributor.

Figure 1B:
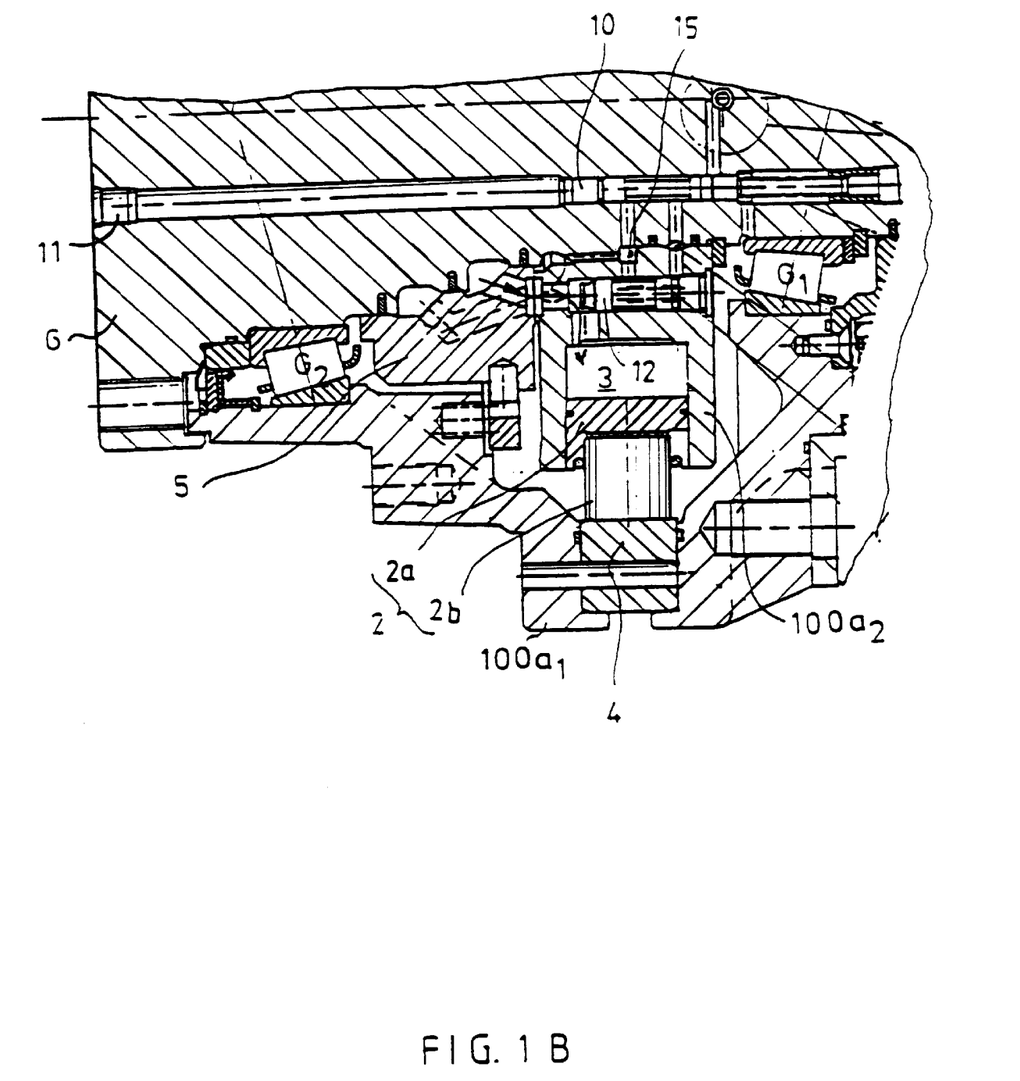
FIG. 1B is a side view of the equipment shown in FIG. 1A, and, based on this illustration, the operation of the revolving distributor, i.e. of the distributor valve, will be explained in more detail.

FIG. 1B is a side view of the equipment as shown in FIG. 1A. The fluid is passed through annular ducts placed in connection with the distributor valve 5, i.e. the distributor, into the bore in the distributor, and through the bores the pressurized medium is passed into one or several pistons in the power stage so that, when the distributor revolves, the bores in the distributor that are subjected to fluid pressure meet the bores of the pistons that are in the power stage. In the next stage, the pressure spaces are shifted to the following piston mechanisms, and the pistons in the power stage are now brought into connection with the set of return flow ducts. In FIG. 1B, a closing valve 12 in accordance with the invention is fitted in the cylinder frame 100$a_2$, by means of which valve 12 the connection of the fluid of higher working pressure with the piston space is closed. Thus, said piston can be switched off from operation, and thereby the volume per revolution of the hydraulic motor, i.e. its speed of rotation and its torque, can be changed.

Figure 2:
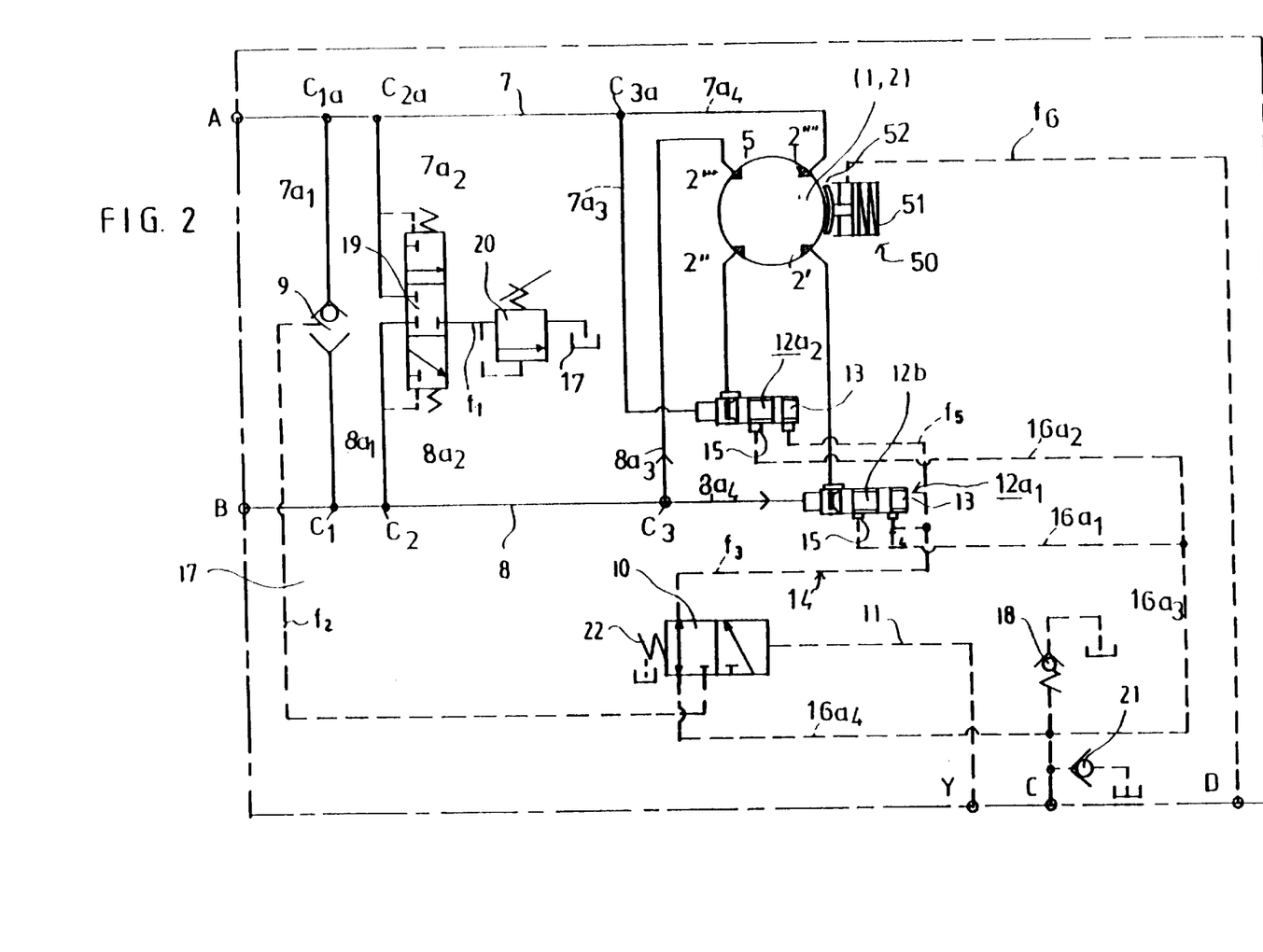
FIG. 2 shows the hydraulic diagram of a first preferred embodiment of the radial-piston hydraulic motor in accordance with the invention.

FIG. 2 shows the hydraulic diagram of a first preferred embodiment of the invention. In the embodiment of FIG. 2, there is one cylinder group 1 only. In the figure, it is shown that the cylinder group 1 comprises four piston mechanisms 2, i.e. the piston mechanisms 2',2",2'" and 2"". Each piston mechanism comprises a piston 2$a$ and a connected press wheel 2$b$, which can be brought into contact with the face of the cam ring 4. In the embodiment shown in FIG. 1, the piston mechanisms 2' and 2" are piston mechanisms that can be connected out of operation by means of the solution of equipment in accordance with the invention, whereby the volume per revolution of the motor can be changed. According to the invention, this takes place so that, between the piston spaces of the piston mechanisms 2' and the distributor valve 5, a closing valve 12 is fitted, which can be opened when desired, so that the fluid of high working pressure enters into the piston space of said piston mechanism, and which valve can be closed in a case in which it is desirable to exclude said piston mechanism from operation, in which case the piston space 3 of the piston mechanism is connected to the leakage duct 16. In the embodiment of FIG. 2, the closing valves 12$a_1$,12$a_2$ and, thus, the piston mechanisms 2' and 2" are controlled at the same time, and thus, in the embodiment of FIG. 1, there are two modes of operation, i.e. a first mode, in which all the piston mechanisms 2'. . . 2"" in the cylinder group 1 are in operation, and a second mode, in which just one half of the piston mechanisms in the cylinder group 1, i.e. the piston mechanisms 2'" and 2"" are in operation, whereas the piston mechanisms 2',2" have been switched off.

In the following, the various components in the hydraulic diagram of FIG. 2 and the lines passing to them will be described.

The connections A and B are operation-pressure, i.e. so-called working-pressure connections. Through the duct 8, the highest working pressure is passed to the cylinder group 1, and the return flow at a lower pressure passes through the duct 7. When the sense of rotation of the motor is reversed, the highest working pressure is passed into the duct 7. The duct 8 comprises the branch points $C_1,C_2,C_3$, from which there are the ducts 8$a_1$, 8$a_2$,8$a_3$ and 8$a_4$. From the branch point $C_1$ the duct 8$a_1$, passes to the exchange valve 9, from the branch point $C_2$ the line 8$a_2$ passes to the directional valve 19, and from the branch point $C_3$ the branch line 8$a_3$ passes to the piston mechanism 2'", and from the branch point $C_3$ the line 8$a_4$ passes to the closing valve 12$a_1$. Similarly, the duct 7 comprises the branch points $C_{1a},C_{2a}$, $C_{3a}$. From the branch point $C_{1a}$ the duct 7$a_1$, passes to the exchange valve 9, from the branch point $C_{2a}$ the branch line 7$a_2$ passes to the directional valve 19, and from the branch point $C_{3a}$ there are the branch lines 7$a_3$ and 7$a_4$, the branch line 7$a_3$ passing to the closing valve 12$a_2$, and the branch line 7$a_4$ passing to the piston mechanism 2"" of the cylinder group 1.

In the solution in accordance with the invention, the closing valves 12$a_1$ and 12$a_2$ are so-called spindle valves, whose function is to pass the working pressure from one end of the spindle valve through the spindle valve to the piston mechanism connected with the spindle valve of the cylinder group 1 when the spindle is in one of its end positions and when the control pressure does not act upon the annular space 13 in the spindle valve. If the control pressure has access into the space 13 at the other end of the spindle valve, by means of the control pressure passed into said space the spindle 12$b$ can be shifted into the other extreme position, in which case the connection from the pressure line 8 to said piston mechanism of the cylinder group 1 is closed, and the piston and the piston space 3 of the piston mechanism concerned are brought, through the annular space 15 in the spindle 12$b$, into connection with the leakage line 16$a_1$ of the motor and further with the leakage line 16$a_3$. A similar operation takes place in respect of the closing valve 12$a_2$.

In the embodiment of FIG. 2, there are two closing valves, i.e. 12$a_1$ and 12$a_2$.

The operation of the directional valve 19 is as follows. Depending on the line, i.e. the line 7$a_2$ or the line 8$a_2$, into which the higher pressure enters, the spindle of the valve 19 is displaced so that the connection from the pressure line 7$a_2$/8$a_2$ to the line $F_1$ and to the pressure relief valve 20 is opened, i.e that the lower-pressure line of the working pressure lines 7 or 8 is connected to the line $f_1$ and through the pressure relief valve 20 to the box space 17.

From the exchange valve 9, the line $f_2$ passes to the speed-change valve 10, so that, when the control pressure is passed into the line 11, the spindle of the valve 10 is shifted so that the line $f_2$ is brought into connection with the line $f_3$, which further communicates with the closing valves 12$a_1$, 12$a_2$ through the branch lines $f_4$ and $f_5$ so as to control said closing valves and thereby to transfer the control pressure into connection with the spindles 12$b$ of said closing valves, so that the closing valves 12$a_1$,12$a_2$ close the pressure lines 8 passing to the pistons connected with said closing valves. From the closing valves 12$a_1$,12$a_2$, the lines 16$a_1$, 16$a_2$ pass to the leakage line 16$a_3$. Similarly, when no pressure is passed into the control line 11, the line $f_2$ is closed, and the line $f_3$ communicates with the leakage line 16$a_4$ through the valve 10. In such a case, the leakage lines 16$a_1$,16$a_2$ and 16$a_3$ still communicate with the box space 17 of the hydraulic motor through the check valve 21.

The coupling 50 is brought into the open position and, thus, the braking operation is switched off when the control pressure is passed into the line $f_6$ and a piston or equivalent, for example lamellae 52, are displaced so that they are brought out of contact with the backing piece. Then, the locking between the rotatable box $100a_1$ and the shaft 6 is opened. The spring force of the spring 51 keeps the coupling engaged. When no control pressure is passed into the line $f_6$, the coupling 50 is always in the closed position by the effect of the spring force of the spring 51.

In FIG. 2, the contours of the motor have been drawn with broken lines, and the connections passing to/from the motor have been indicated with the letters A,B,Y,C, and D. The connection D serves for operation of the coupling, the connection C is the connection to the box space 17, the connection Y is the input connection for the control pressure of the speed-change valve, and the connections A and B are connections for the operating pressure, i.e. so-called working pressure connections.

Operation of a two-speed motor

According to the invention, the volume per revolution of the radial-piston motor can be reduced by closing the feed of the fluid flow into the piston space 3 of one or several piston mechanisms 2. This takes place so that the higher working pressure of the motor is passed through the exchange valve 9 to the speed-change valve 10. The speed-change valve 10 is switched by connecting the control pressure to the control line 11 of the speed-change valve 10. The speed-change valve 10 connects the higher working pressure of the motor to a particular annular space 13 also in the closing valve 12. Then, the closing valve 12 closes the feed of the fluid flow from the working-pressure duct 8 to the piston space 3 of the piston mechanism 2. If desired, it can be ensured that the closing valve 12 remains closed by using a larger area at the side of the spring housing 13 in the closing valve as compared with the opposite end of the closing valve 12. By using a particular distributor duct, which is denoted with the general reference numeral 14, between the speed-change valve 10 and the closing valves 12, it is possible to close the feed to one or several piston mechanisms 2 at the same time. The duct 14 comprises duct portions $f_3, f_4$ and $f_5$, as is indicated in FIG. 2. Said closing valve 12 is shaped so that, at the same time as it closes the supply of the fluid flow into the piston space 3 of the piston mechanism 2, it connects said piston space 3 with a pressure-free space 15. This pressure-free space 15 is an annular duct, which again communicates with the leakage line 16 of the motor. In such a case, when revolving in relation to the stationary cylinder group 1, the wave-shaped form of the cam ring 4 presses the entire piston mechanism 2, by the intermediate of the press wheel 2b of the piston 2a, into the interior of the cylinder group 1. Then, the press wheel 2b of the piston mechanism 2 loses its contact with the face of the cam ring 4.

The holding of the piston mechanism 2 in the interior of the cylinder group 1 can be ensured by forming a difference in pressure between the piston space 3 of the piston mechanism 2 and the box space 17 of the motor. This is produced by throttling the leakage fluid flowing out of the box space 17 of the motor by means of a springloaded check valve 18.

According to the invention, the shifting of the piston mechanism 2 into the cylinder group 1 can be intensified by means of a separate set of valves 19,20. The set of valves 19,20 includes a directional valve 19, which operates by means of a difference in pressure so that, of the two working-pressure ducts 7 and 8 of the motor, it connects the duct with the lower pressure into connection with the pressure relief valve 20, through which pressure relief valve 20 the desired fluid flow is discharged into the box space 17 of the motor and fills the shortage that tends to be formed in the box space 17 of the motor as the wave-shaped cam ring 4 presses one or several piston mechanisms 2, by the intermediate of the press wheel 2b, into the cylinder group 1. This set of valves 19,20 contributes to permitting a change in the volume per revolution also at high speeds of rotation of the motor, because the piston mechanism 2 is transferred more quickly into the cylinder group 1 and the press wheel 2b of the piston 2a does not tend to be struck against the face of the wave-shaped cam ring 4.

According to the invention, the shifting of the piston mechanism 2 into the cylinder group 1 can also be made quicker by means of a check valve 21. The check valve 21 is placed so that it short-circuits the piston spaces 3 of the piston mechanism 2 through the system of ducts 15,16 with the box space 17 of the motor. When the wave-shaped cam ring 4 presses one or several piston mechanisms 2, by the intermediate of the press wheel 2b, into the cylinder group 1, a vacuum tends to be formed in the interior of the box space 17 of the motor, which vacuum is, however, equalized with the aid of said check valve 21. In other words, the fluid flow that is discharged out of the piston space 3 of the piston mechanism 2 is passed through the system of ducts 15,16, in the free flow direction of the check valve 21, into the box space 17 of the motor. After the piston mechanisms 2 moved fully into the cylinder group 1 and the press wheels 2b of the pistons 2a were separated from the cam ring 4, the check valve 21 is closed as the leakage fluid discharged into the box space 17 of the motor or the fluid flow that had been fed into the box space 17 earlier by means of said set of valves 19,20 forms a pressure in the box space 17 of the motor when the flow is throttled by the spring-loaded check valve 18 mentioned above.

When the control line 11 of the speed-change valve 10 is connected with a pressure-free space outside the motor, the spring 22 presses the speed-change valve 10 back into its original position. Then, the speed-change valve 10 connects the spring housings 13 of the closing valves 12 through the distributor duct 14 to the pressure-free space 15. When no control pressure is passed to the closing valve 12, the pressure of the working pressure shifts the spindle 12b of the closing valve 12 into a position in which the connection from the working-pressure duct 8 through the closing valve 12 into the piston space 3 of the piston mechanism is opened, and the cylinder concerned is brought into contact with the cam ring 4. In its connection, the spindle 12b of the closing valve 12 includes a spring, which presses the spindle 12b of the closing valve 12 into a position that closes the duct 8 when no pressure has been passed into the duct 8. In such a case, the fluid in the piston space 3 communicates with the leakage duct 16 through the space 15 of the valve 12. When pressure is passed to the closing valve 12, the closing valve 12 closes the connection of the piston space 3 with the pressure-free space 15 and, at the same time, opens the duct from the distributor valve 5 to the piston space 3. The fluid flow presses the press wheel 2b of the piston mechanism 2 into contact with the cam ring 4 and produces a higher torque of the motor when the press wheel is pressed against the wave-shaped face of the cam ring 4. Then, the motor has its maximal volume per revolution.

Figure 3:
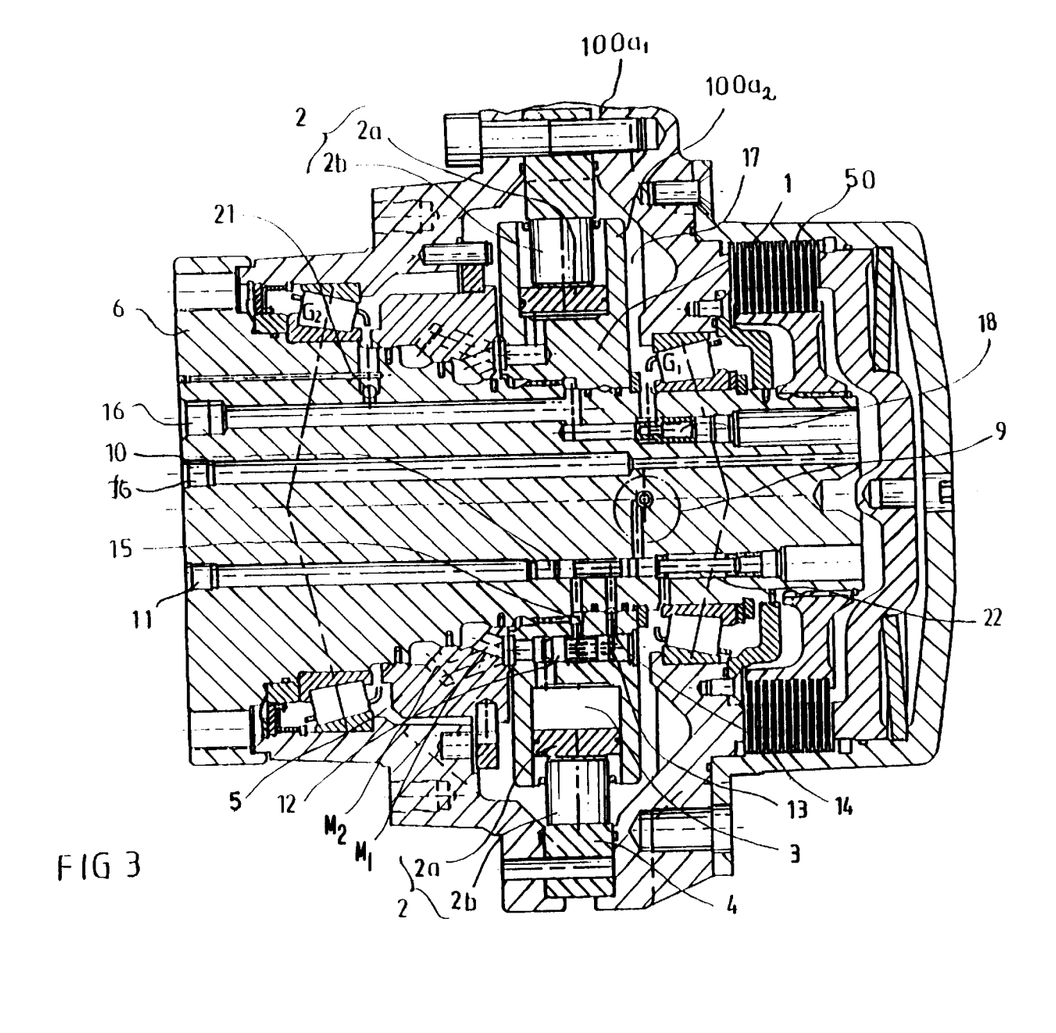
FIG. 3 is a sectional view of a hydraulic motor related to the embodiment shown in FIG. 2.

FIG. 3 is a sectional view of the construction of the motor shown in FIG. 2. The sectional view shows the piston mechanisms 2' and 2'''. The revolving box frame $100a_1$ of the device comprises a cam ring 4 and a distributor valve 5 that revolves along with the box $100a_1$. The distributor valve 5, i.e. the distributor, comprises bores $m_1, m_2 \ldots$, which communicate both with the working-pressure line 8 and with the return line 7. When the box $100a_1$ revolves, the distributor valve 5, i.e. the distributor, which revolves along with the box, communicates through pressure lines with the ducts $n_1, n_2 \ldots$ placed in the cylinder frame $100a_2$, which is the stator in the stationary shaft 6. The cylinder frame $100a_2$ comprises piston bores 3 for the piston of each piston mechanism. Further, for example, exactly the piston mechanism 2' includes a closing valve $12a_1$ placed in the cylinder frame $100a_2$. The speed-change valve 10 is fitted in the stationary shaft 6, and the duct 11 is passed as parallel to the shaft 6 to the speed-change valve 10.

When the piston mechanism 2' is closed out of operation, the control pressure is passed along the line 11 in the shaft 6 to the speed-change valve 10, to the end of its spindle 10a, and the spindle is controlled against the spring force of the spring 22 into a position in which the working pressure is controlled from the line $f_2$ through the valve 10 to the line $f_3$ and from it into the annular space 14 and further into the spring housing 13 in the closing valve $12a_1$. Then, the spindle 12b of the closing valve $12a_1$ is shifted by the effect of the pressure into a position (to the left in the figure) in which the connection from the pressure line 8 through the distributor valve 5 to the cylinder frame $100a_2$ and, thus, to the piston 2' is closed.

In the embodiment of FIG. 3, the cam ring 4 is connected with the rotatable box frame $100a_1$, with which the distributor 5, i.e. the distributor valve, is also connected. The shaft 6 is in a stationary position, and so is the cylinder frame $100a_2$, which is connected with the shaft by means of a grooved joint. The box frame $100a_1$ is rotated in relation to the shaft 6 on support of bearings $G_1, G_2$.

Figure 4A:
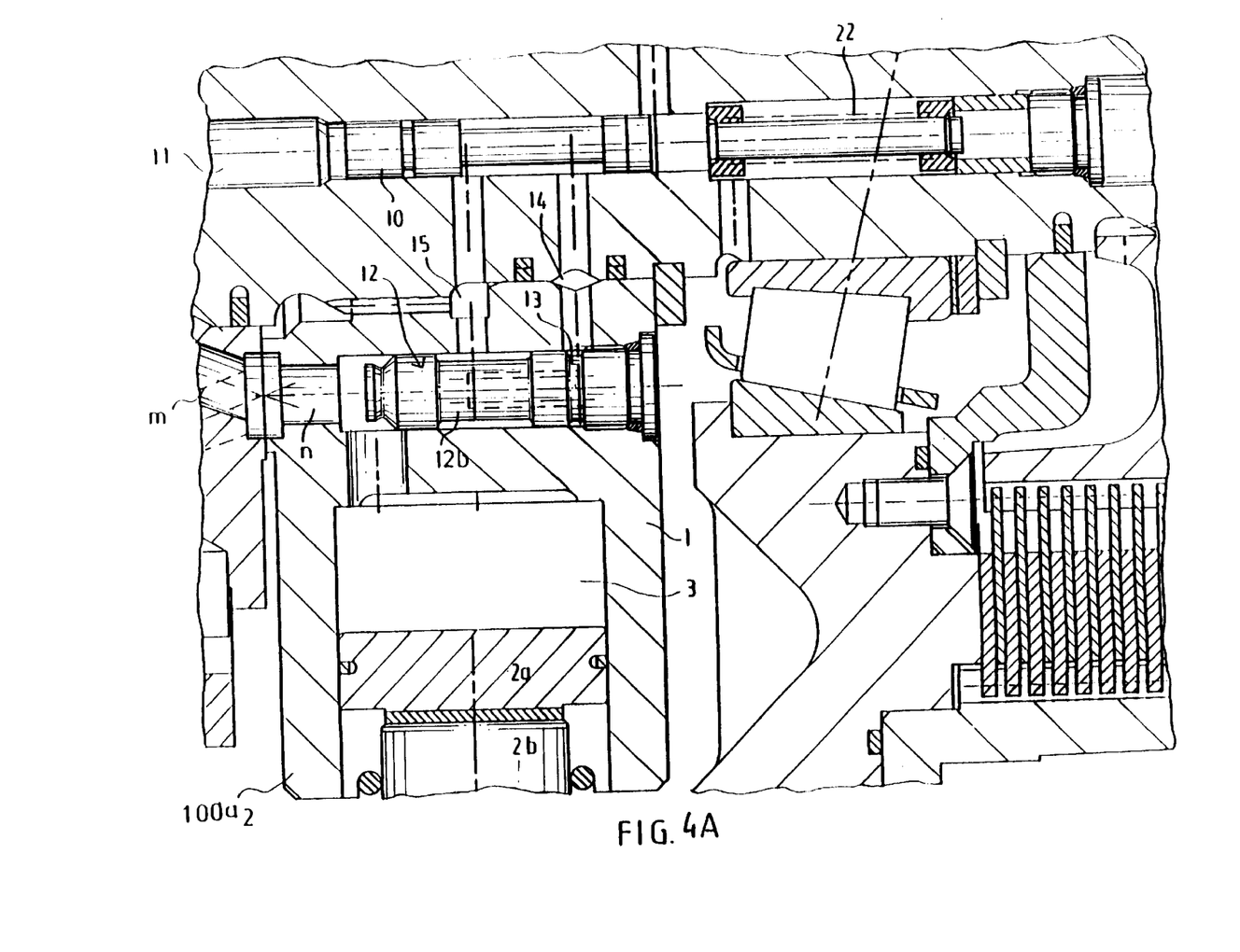

FIG. 4A shows the area of the piston mechanism 2' from FIG. 3 on an enlarged scale. The press wheel 2b of the piston mechanism is in contact with the cam ring 4. Then, the control pressure is passed to the closing valve 12, whereby the closing valve 12 admits the working pressure into the piston space 3.

Figure 4B:
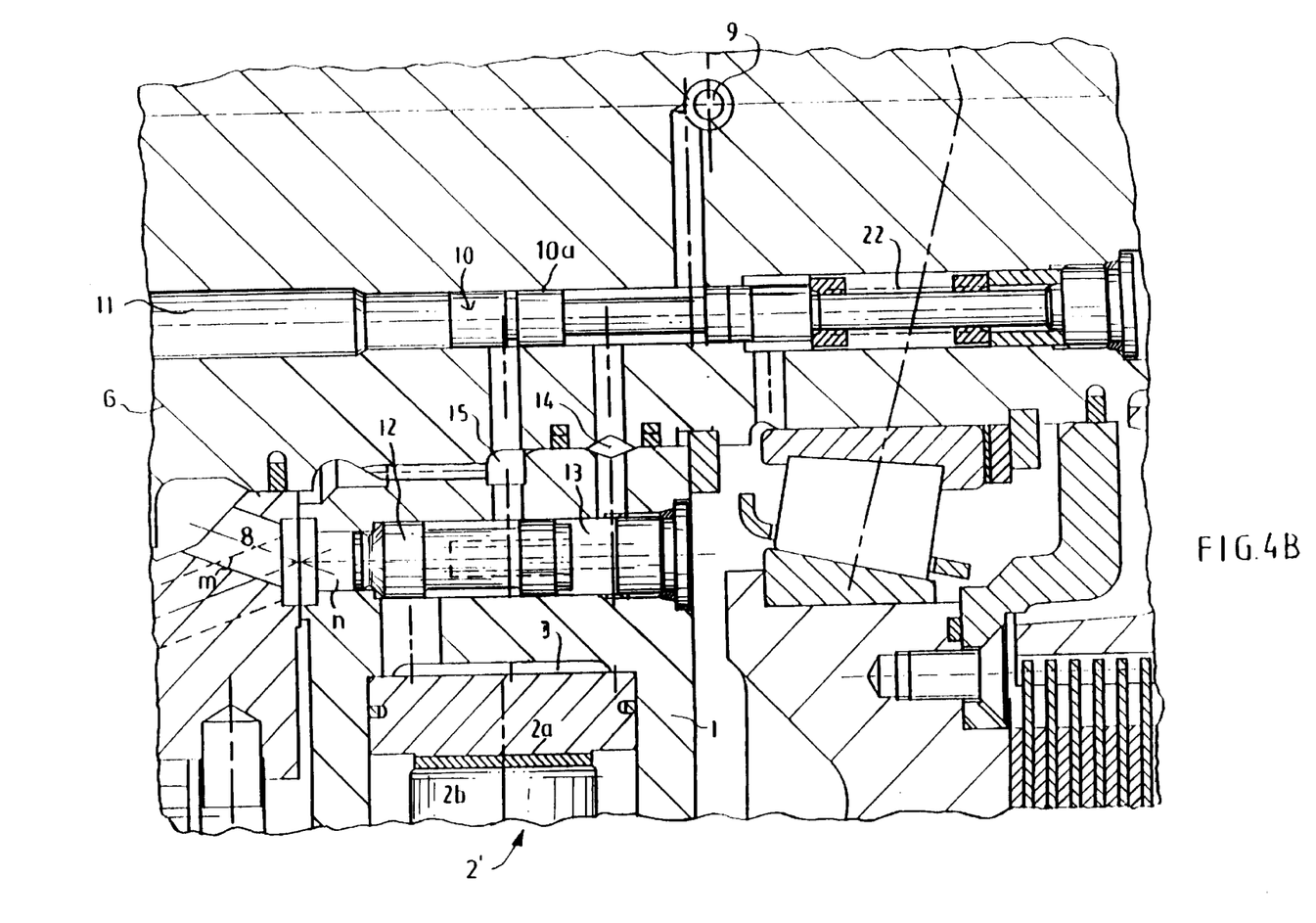
Figure 5:
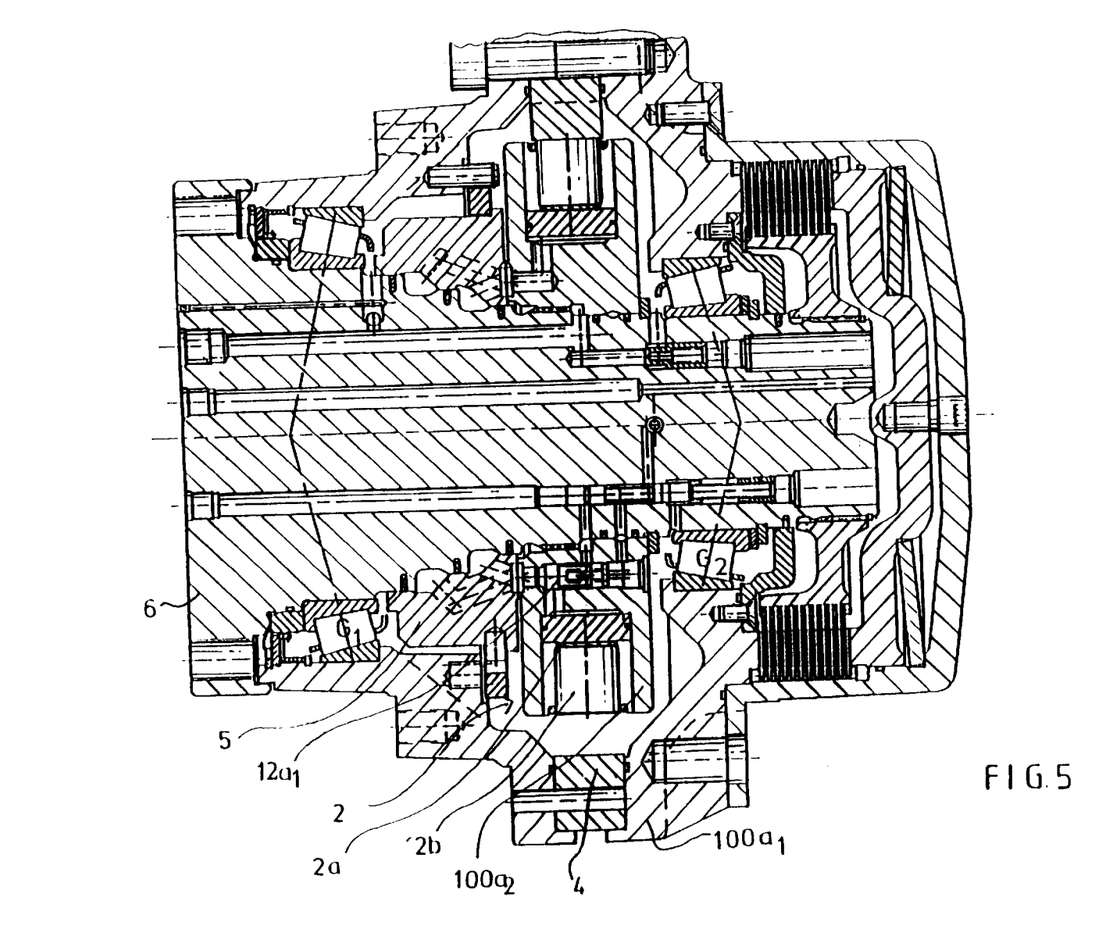
FIG. 5 shows the hydraulic motor of FIG. 3 in a stage in which one piston has been switched out of operation with its press wheel fitted to be placed out of contact with the cam ring.

FIG. 4B shows the area of the piston mechanism 2' from FIG. 5 on an enlarged scale. The press wheel 2b of the piston mechanism is placed apart from the cam ring 4.

The closing valve 12 in the closed position, and no control pressure arrives in the closing valve.

FIG. 5 shows the closing valve $12a_1$ in the closed position, in which position the piston mechanism 2' has been pressed into the cylinder frame $100a_2$, into the piston space 3 in the cylinder frame, and in which position the press wheel of the mechanism is placed apart from the cam ring 4.

Figure 6:
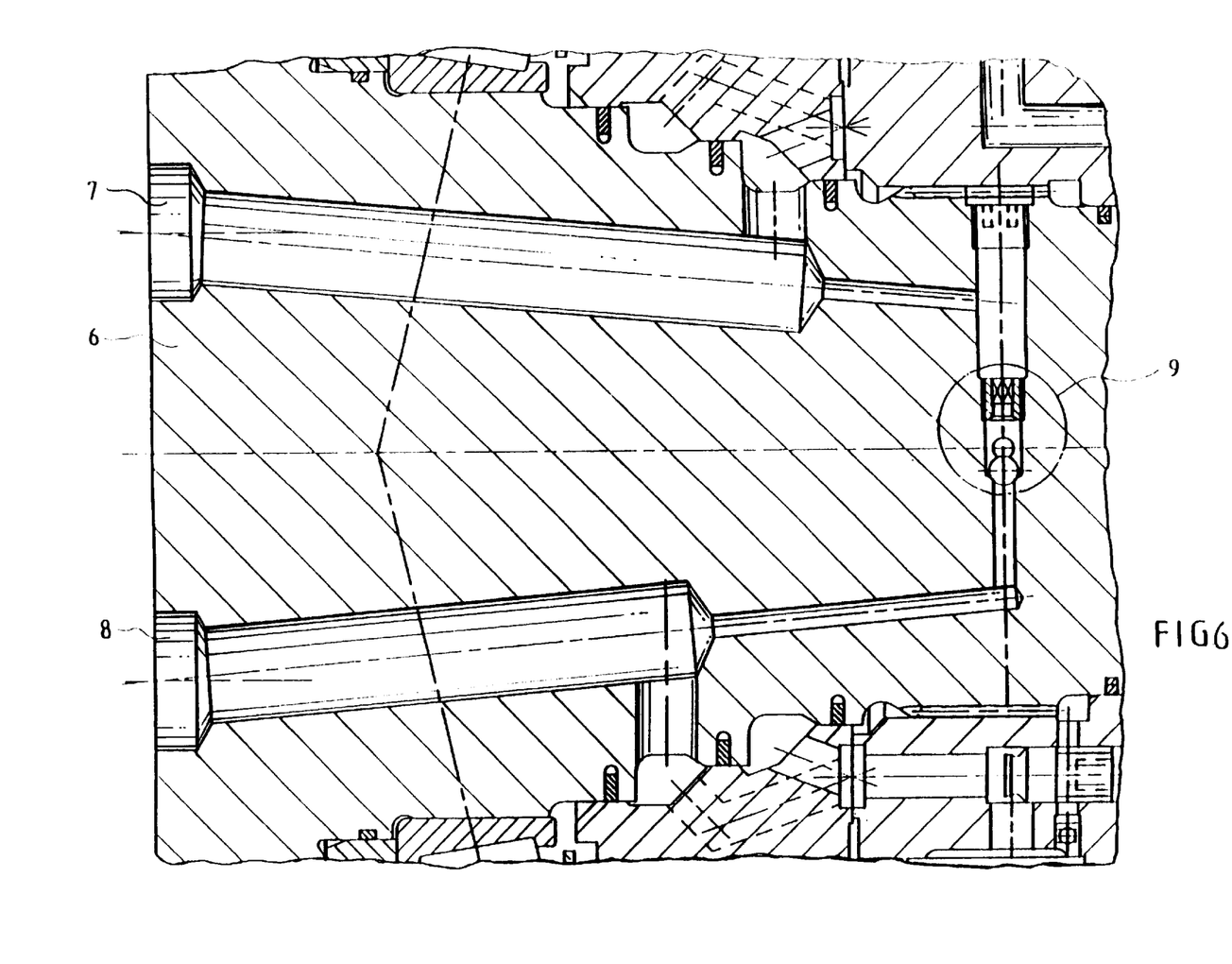
FIG. 6 shows the working-pressure ducts placed in the shaft 6 and communicating with the exchange valve.

FIG. 6 shows the working-pressure ducts 8 and 7, which communicate with the exchange valve 9.

Figure 7:
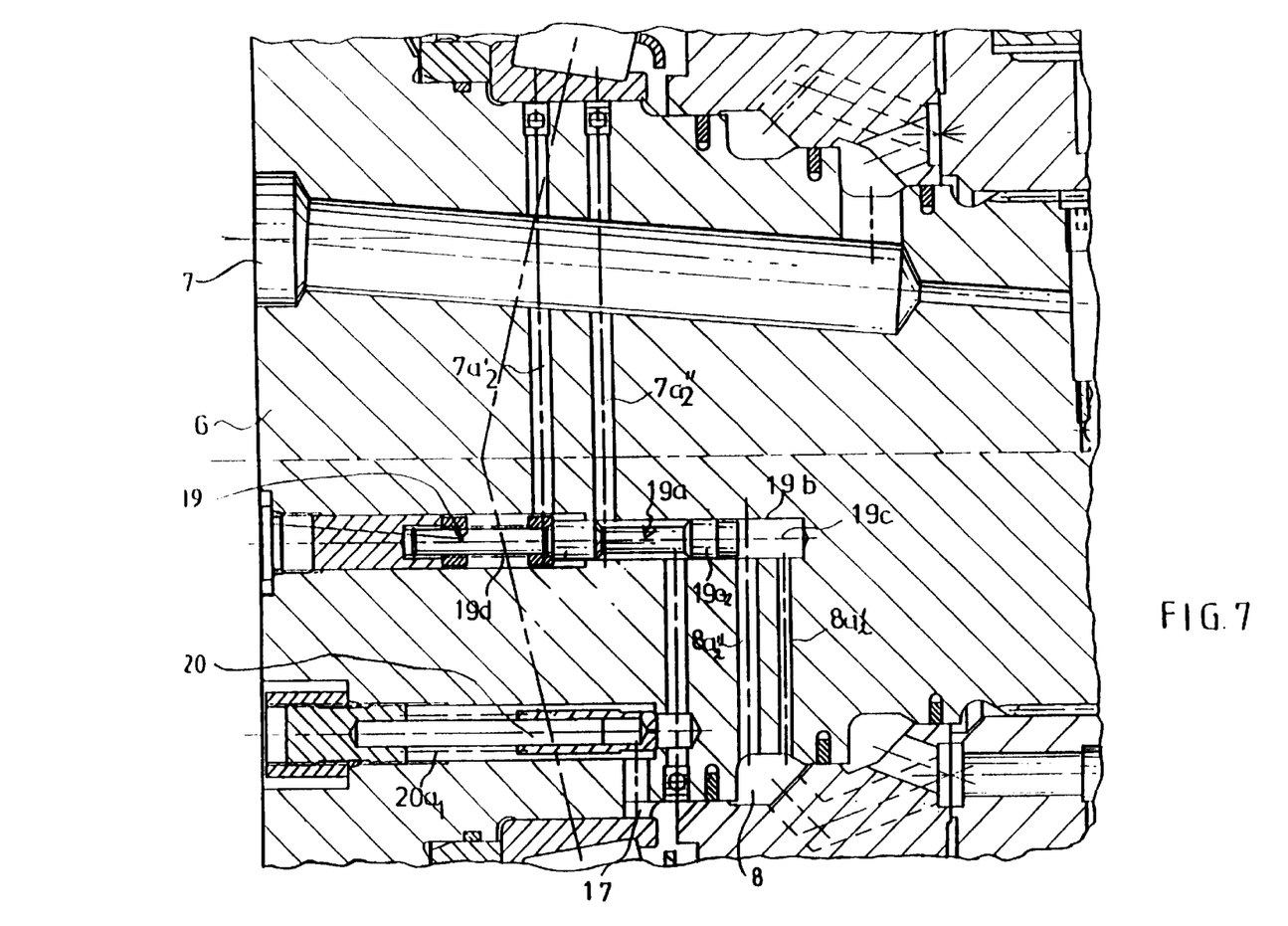
FIG. 7 shows the constructions of the exchange valve and of the related pressure relief valve in the shaft 6.

FIG. 7 shows the location of the valves 19 and 20 in the stationary shaft 6. It is shown in the figure that the duct 8 is the duct at a higher pressure, and the pressure in the duct 8 is passed through the bores $8a_2', 8a_2''$ passing from said pressurized duct into the end 19c of the bore 19b of the spindle 19a of the valve 19. Similarly, from the return duct 7, the fluid of lower pressure is passed through the ducts $7a_2', 7a_2''$ to the valve 19. As is shown in the figure, since the pressure present in the space 19c is higher than the pressure in the space 19d, the spindle 19a has been shifted into the position shown in the figure, and from the duct 7 of lower pressure the fluid is passed through the valve 19 to the pressure relief valve 20 and further into the box space 17. The spring forces of the valve 20 and of the spring $20a_1$ are adjustable. By means of the valve 20, the flow into the space 17 is controlled.

Figure 8:
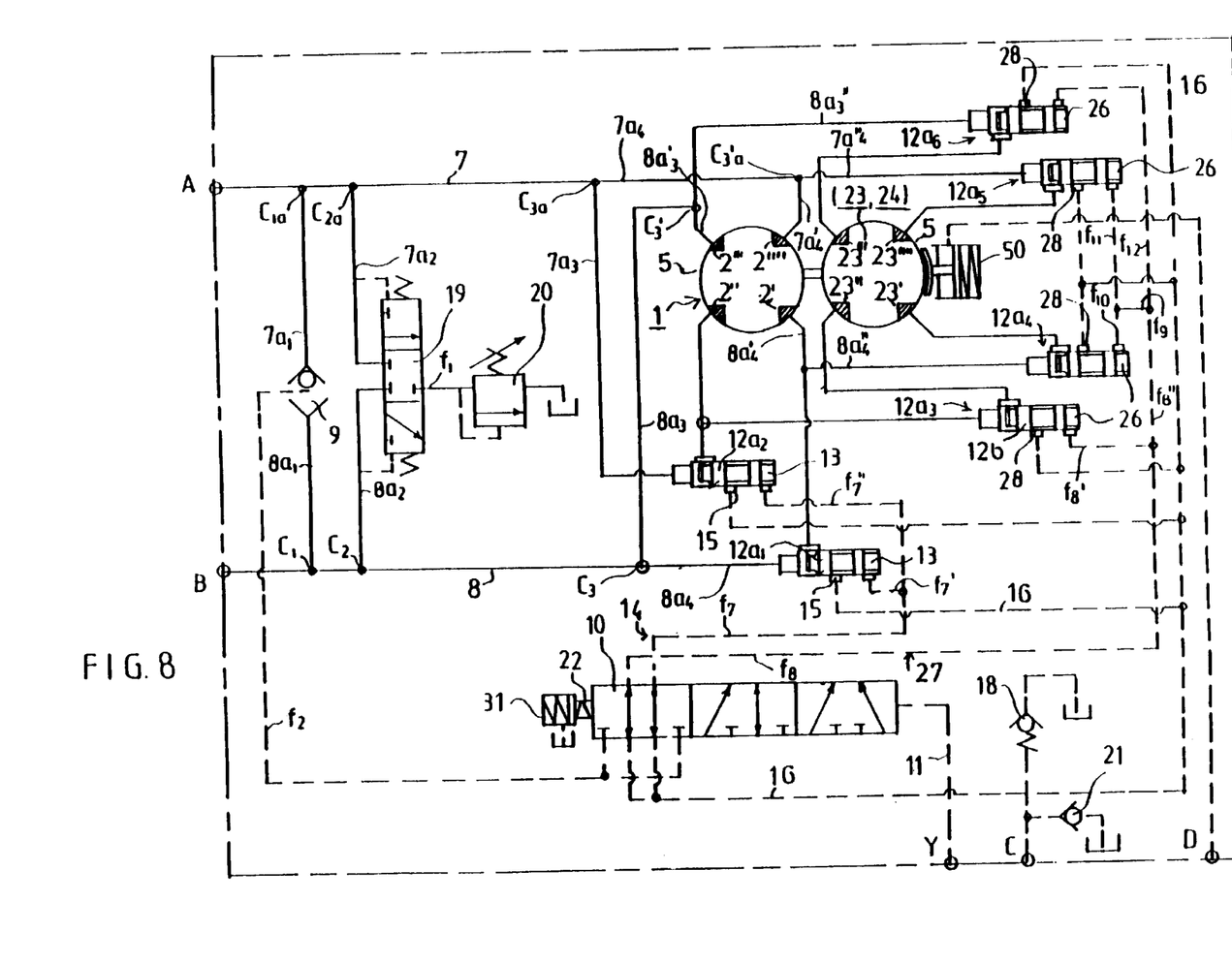
FIG. 8 shows the hydraulic diagram of a second preferred embodiment of the invention.

FIG. 8 shows a second embodiment of the invention, which is related to a three-speed motor. The hydraulic diagram of a three-speed motor is shown. As is shown in the hydraulic diagram in FIG. 8, the solution of equipment comprises two cylinder groups: the cylinder groups 1 and 24. Each cylinder group comprises piston mechanisms; the cylinder group 1 comprises the piston mechanisms 2', 2'', 2''' and 2'''', and the cylinder group 24 comprises the piston mechanisms 23', 23'', 23''', 23''''. The hydraulic diagram of FIG. 8 is in the other respects similar to the hydraulic diagram of FIG. 2, except that, in this solution, two cylinder groups are used, in whose cylinder groups the press wheels 2b, 23b of the piston mechanisms are in contact with the cam ring 4. In the solution, a three-position speed-change valve 10 is used. The speed-change valve 10 comprises a control-pressure line 11 connected to the end of its spindle, into which pressure line two control pressures of different pressure levels can be passed. If no control pressure is passed, the speed-change valve 10 is in a position in which the spindles 12b of the closing valves $12a_1 \ldots 12a_6$ related to the piston mechanisms are in a position in which the pressurized fluid flow from the working-pressure duct has access into the piston spaces in the piston mechanisms connected with said closing valves. If a first pressure, which is lower than a second pressure, is passed into the control line 11, the spindle 10a of the speed-change valve 10 is shifted into a position in which a part of the closing valves, i.e. the closing valves $12a_3 \ldots 12a_6$ are switched on, i.e. to close the access of the working pressure into the piston mechanisms. When the higher pressure is passed into the speed-change valve 10 along the control-pressure line 11, the spindle 10b of the speed-change valve 10 is shifted into a position in which the control pressure is controlled to all of the closing valves $12a_1 \ldots 12a_6$ of the cylinder groups 1,24. When no control pressure is introduced, the spindle of the speed-change valve 10 is shifted back into its original position, and all the piston mechanisms are in operation.

The hydraulic diagram shown in FIG. 8 is to a great extent similar to the hydraulic diagram of the embodiment described above. In the hydraulic diagram of FIG. 8, the high-pressure working pressure is passed along the duct 8, and the return line 7 has a lower working pressure. If it is desirable to reverse the sense of rotation of the motor, the working pressures passed into the connections A and B are interchanged.

The line 8 comprises the branch points $C_1, C_2, C_3$, from which there are the branch duct $8a_1$ to the valve 9, the branch duct $8a_2$ to the valve 19, and the branch ducts $8a_3$ and $8a_4$ from the branch point $C_3$. The branch duct $8a_4$ passes to the directional valve $12a_1$, and the branch duct $8a_3$ is branched from the branch point $C_3'$ to the piston mechanism 2''' of the cylinder group 1 and to the closing valve $12a_6$. Similarly, the return line 7 comprises the branch points $C_{1a}, C_{2a}, C_{3a}, C'_{3a}$. From the branch points $C_{1a}, C_{2a}, C_{3a}$, there are the duct $7a_1$ to the valve 9, the duct $7a_2$ to the valve 19, and the duct $7a_3$ to the closing valve $12a_2$, and from the branch point $C_{3a}$, there is a further line $7a_4$ to the branch point $C'_{3a}$, from which there are the lines $7a_4'$ and $7a_4''$. The line $7a_4'$ passes to the mechanism 2'''' of the cylinder group 1, and from the branch point $C_{3a}'$, moreover, the duct $7a_4''$ passes to the closing valve $12a_5$.

From the valve 9, a pressure duct $f_2$ passes to the speed-change valve 10, and from the speed-change valve 10 there are outlets $f_7$ and $f_8$ for controlling the closing valves $12a_1 \ldots 12a_6$.

As is shown in FIG. 8, the duct 14 passes to the closing valves $12a_1, 12a_2$. The duct 14 comprises duct portions $f_7, f_7', f_7''$.

Similarly, from the valve 10, there is a control duct 27 to the closing valve $12a_3, 12a_4, 12a_5$ and $12a_6$ of each piston mechanism. The duct 27 comprises the duct portions $f_8, f_8'$, $f_8''$, $f_9, f_{10}, f_{11}, f_{12}$. For the sake of clarity of illustration, the leakage ducts passing from the closing valves $12a_1 \ldots 12a_6$ are denoted with the general reference numeral 16.

Operation of a three-speed motor in more detail

It is characteristic of the radial-piston hydraulic motor equipment in accordance with the invention shown in FIG. 8 that one or several closing valves 12 mentioned above can be placed in the cylinder groups 1,24 depending on the number of piston mechanisms 2,23 that are supposed to be coupled in the cylinder group 1,24. If there are several cylinder groups 1,24 in the motor, several different volumes per revolution can be obtained by coupling the piston mechanisms 2,23 inside the cylinder group in several different stages. In the construction shown, there are two cylinder groups 1,24 placed side by side, each of which contains a piston mechanism 2,23 of its own. The press rolls 2b,23b of the pistons in the cylinder groups 1,24 may roll along the face of a common cam ring 4, or there may be a cam ring 4 of its own for each cylinder group. The depth of the wave in the cam rings 4 may also differ from one another.

Also, the diameters of the pistons 2a,23a may be different in the cylinder groups 1,24. By means of combinations of these alternatives, several different combinations of volume per revolution are obtained advantageously.

The construction shown includes a valve system 10', in which three different volumes per revolution can be obtained by means of the same control-pressure connection 11. This has been accomplished by using a three-position speed-change valve 10. In the first position of the speed-change valve 10, when no control pressure is passed into its control-pressure line 11, the motor is connected to full volume per revolution. In such a case, the piston mechanisms 2,23 of both of the cylinder groups 1,24 are, by the intermediate of the press wheels 2b,23b, in contact with the cam ring 4 and produce a full torque while subjected to the working pressure. Then, the annular spaces in the closing valves 12 in both cylinder groups 1,24, i.e. the spring housings 13,26, communicate through the system of ducts 14,27 with the speed-change valve 10 and through said valve further with the pressure-free spaces 15,28 of the closing valves, and from said spaces they communicate with the leakage line 16 of the motor and thereby permit flow of the fluid through the distributor valve 5 into the piston spaces 3,29 of all piston mechanisms 2,23 in both cylinder groups 1,24.

In the second position of the speed-change valve 10, which is produced by feeding a first pressure level into the control-pressure line 11, this pressure level produces a movement of the speed-change valve 10 against a first pre-tensioned spring 22. The speed-change valve 10 moves until it collides against a stop 30, against which a second spring 31 is pre-tensioned. This spring 31 has been tensioned at a higher, second pressure level; thus, this first pressure level with which the speed-change valve 10 is displaced cannot compress it, but the movement of the speed-change valve 10 stops against this stop 30. In this position, the speed-change valve 10 closes the connection of the spring housings 26 of the closing valves 25 of the cylinder group 24 with the pressure-free space 28 and passes the higher pressure of the working-pressure duct 7 and 8 through the exchange-check valve 9 into the spring housings 26 of the closing valves 12 of the first cylinder group 24, whereby the spring housings 26 are closed and connect the piston spaces 29 of the piston mechanisms 23 to the pressure-free space 28. Then, the piston mechanisms 23 of said first cylinder group 24 move into the interior of the cylinder group 24 while the wave-shaped cam ring 4 presses them by means of the press wheels 23b. This movement can be made quicker by means of the system of valves 18,19,20,21 described above. In this way, the second range of volume per revolution of the motor has been reached.

The third position of the speed-change valve 10 is produced by, to the control line 11 of the speed-change valve 10, connecting a second pressure level, which is higher than the first pressure level. This second pressure level acts upon the speed-change valve 10 with a force higher than the force to which the second spring 31 that limits the spindle has been pre-tensioned. In this way the speed-change valve 10 is shifted further to the third position against the mechanical limiter 32.

In this third position, the speed-change valve 10 closes the connection of the spring housings 13 of the closing valves 12 in the second cylinder group 1 with the pressure-free space 15 and connects the higher working pressure through the system of ducts 14 to the spring housing(s) 13 of one or several closing valve(s) 12 in the second cylinder group 1, thereby closing the closing valves 12 and connecting the piston spaces 3 of the piston mechanisms 2 to the pressure-free space 15. In this way, one or several of the piston mechanisms 2 in this second cylinder group 1 also move(s) into the cylinder group 1, and the contact of the press wheels 2b of the pistons 2a of the piston mechanisms 2 with the cam ring 4 ends. The shifting of the piston mechanisms 2 into the cylinder group 1 can be made quicker by means of the system of valves 18,19,20,21 described above. In this third position of the speedchange valve 10, the higher one of the working pressures of the motor still communicates with the spring housings 26 of the closing valves $12a_3 \ldots 12a_6$ of the first cylinder group 24, and thus, the piston mechanisms 23 of the first cylinder group 24 remain coupled inside the cylinder group 24. In this way, the third range of volume per revolution of the motor has been reached.

Switching of the motor back to full volume per revolution takes place either stepwise by controlling the first pressure level to the control line 11 of the speed-change valve 10, in which case the speed-change valve 10 is shifted to its second position by the effect of the second pre-tensioned spring 31. Then the speed-change valve 10 connects the spring housings 13 of one or several closing valves 12 of the second cylinder group 1 to the pressure-free space 15.

Then the closing valves 12 in the cylinder group 1 close the connection of the piston spaces 3 of the piston mechanisms 2 with the pressure-free space 15 and, at the same time, open the flow duct for the feed coming from the distributor valve 5 into the piston spaces 3 of the piston mechanisms 2. Then the piston mechanisms 2 are shifted, by the intermediate of the press rolls 2b, into contact with the wave-like shape of the cam ring 4 and produce a higher torque of the motor. In this way, the second range of volume per revolution of the motor has been reached.

If the control-pressure line 11 of the speed-change valve 10 is further connected to the pressure-free space outside the motor, the speed-change valve 10 moves into its first position by the effect of the force produced by the first pre-tensioned spring 22. Then, through the system of ducts 27, the speed-change valve 10 connects the spring housings 26 of the closing valves $12a_3 \ldots 12a_6$ in the first cylinder group 24 to the pressure free space 28, and in this way the piston mechanisms 23 of this cylinder group 24 are also shifted, by the intermediate of the press wheels 23b, into contact with the cam ring 4 in the way described above, again producing a higher torque of the motor. In this way, the motor has again been connected to its full volume per revolution.

The speed-change valve 10 can also be lowered directly from the third position to its first position by connecting the control-pressure line 11 directly at once to the pressure-free space outside the motor. Then, the motor is connected directly, in the way described above, to the full volume per revolution.

Flow regulation valve

Figure 9:
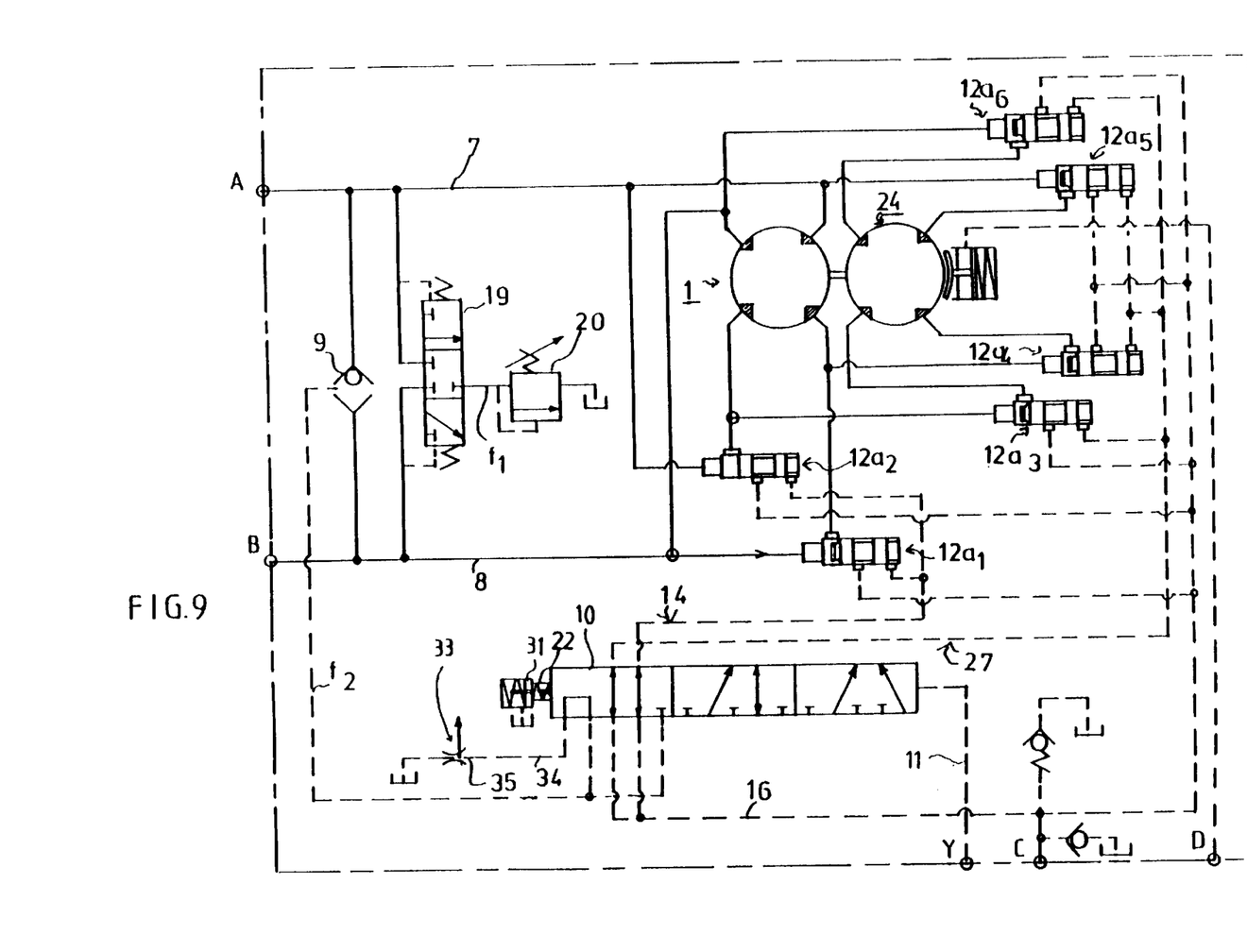
FIG. 9 shows a hydraulic diagram which comprises a flow regulation valve used for regulation of a three-speed motor.

In the hydraulic diagram in FIG. 9, a flow regulation valve 33 is shown. According to the invention, in connection with the exchange-check valve 9 and the speed-change valve 10 mentioned above, while making use of said valves, a flow regulation valve 33 can be connected, through which the desired fluid flow can be tapped under control from the working-pressure duct 7 or 8 of higher pressure of the motor while by-passing the distributor valve .5 and the piston mechanisms 2,23 of the motor. Said fluid flow is discharged through the box space 17 of the motor into the leakage line 16 of the motor and through it into the tank of the system.

In the solution that is shown, the speed-change valve 10 has been formed so that this by-pass flow takes place exclusively when the motor is in the range of full volume per revolution. The higher working pressure coming from the exchange-check valve 9 is connected through the groove in the speed-change valve 10 to the system of ducts 34, which passes to the flow regulation valve 33. When the flow passes through the small hole 35 in the flow regulation valve 33, a difference in pressure arises, and the lower pressure level thus produced is transferred into the spring housing in the flow regulation valve 33 and has the effect that the flow regulation valve 33 moves forwards so that the edge in the flow regulation valve 33 starts throttling the fluid that flows out from the flow regulation valve 33. In this way, a state of equilibrium arises, and the flow regulation valve 33 attempts to maintain an invariable fluid flow through the flow regulation valve 33 irrespective of the level of working pressure. The force applied to the flow regulation valve 33 by the loss of pressure arising in the small hole 35 in the flow regulation valve 33 is equal to the force of the spring that loads the flow regulation valve 33. Such a controlled by-pass flow is necessary when it is desirable to rotate the motor particularly slowly. This comes from the fact that the output regulation means of the hydraulic pump which feeds pressurized fluid to the radial-piston hydraulic motor do not necessarily operate evenly with very small volumetric flows.

At the stages two and three of the speed-change valve 10, the valve closes the flow to the flow regulation valve 33, and no by-pass flow takes place.

Figure 10:
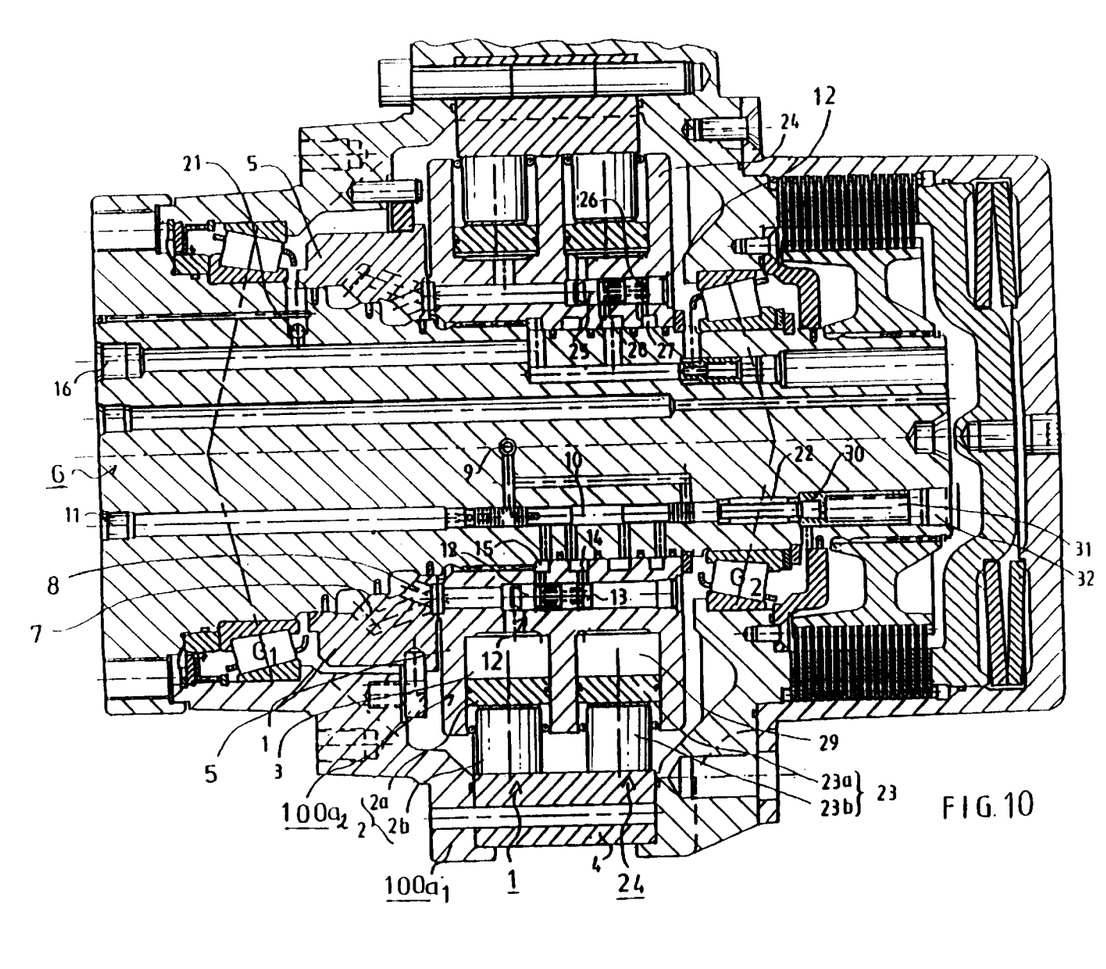
FIG. 10 is a sectional view of the construction of a hydraulic motor in accordance with the embodiment of FIG. 8.

FIG. 10 is a sectional view of a radial-piston hydraulic motor in accordance with the embodiment as shown in FIG. 8. As is shown in FIG. 10, the speed-change valve 10 is placed in the non-revolving central shaft 6, and from the speed-change valve 10, ducts pass to the cylinder frame $100a_2$, which is likewise placed in a stationary, non-revolving position. In the solution, the box frame $100a_1$ and the connected cam ring 4 as well as the distributor valve 5 connected with the box frame $100a_1$ revolve by means of the pistons of the piston mechanisms in the stationary cylinder groups. The embodiment shown in FIG. 10 is to a great extent similar to the embodiment shown in FIG. 2. The shaft 6 is stationary and non-revolving, and the cylinder group $100a_2$ is connected with the shaft 6, preferably by means of a groove joint non-revolvingly. In relation to the shaft 6 and to the cylinder group $100a_2$, the box frame $100a_1$, and the connected cam ring 4 and also the distributor 5 connected with said construction are rotated by means of the work performed by the pistons. Between the shaft 6 and the box frame $100a_1$, there are bearings $G_1, G_2$.

The invention is not supposed to be confined exclusively to an embodiment in which the central shaft is non-revolving and the cylinder group and the cylinder frame are non-revolving, but the solution of equipment is also applicable to a case in which the central shaft 6 is rotated and, correspondingly, the cylinder frame revolves, in which case the stator part and its distributor valve 5 are in a stationary, non-revolving position.

I claim:

1. A radial-piston hydraulic motor, comprising
  a central shaft;
  at least one cylinder group, each of said at least one cylinder group comprising
    a cylinder frame including a plurality of radially oriented recesses and arranged in a stationary position in connection with said shaft;
    a box frame rotatably mounted to said cylinder frame,
    a cam ring having an inner, wave-shaped face arranged in connection with said box frame,
    piston mechanisms having a piston and a press wheel and arranged in said recesses in said cylinder frame such that a piston space is defined between said cylinder frame and each of said pistons, and
    conduit means for passing hydraulic fluid into said piston spaces such that said pistons are pressable against said wave-shaped face of said cam ring to cause said cam ring to revolve in relation to said at least one cylinder group;
  a distributor valve connected to said box frame for controlling flow of the hydraulic fluid to and from said piston spaces via said conduit means in order to selectively displace at least some of said pistons in a power stage outward against said cam ring causing said cam ring to rotate while enabling other of said pistons in a return stage to be displaced inward,
  a set of ducts arranged in said cylinder frame for passing the hydraulic fluid to said distributor valve,
  a closing valve arranged in said cylinder frame and interposed between said distributor valve and at least one of said piston spaces, said closing valve including a movable spindle structured and arranged to control the flow of hydraulic fluid to said at least one piston space independent of the flow of hydraulic fluid to other of said piston spaces, and
  connecting means for fluidly connecting said distributor valve to said closing valve such the hydraulic fluid flows from said distributor valve through said closing valve to said at least one piston space.

2. The motor of claim 1, wherein said distributor valve is permanently attached to said cam ring such that said distributor valve rotates about said shaft.

3. The motor of claim 1, further comprising bearing means for rotatably mounting said box frame to said cylinder frame.

4. The motor of claim 1, wherein said distributor valve includes a plurality of bores communicating with each of said ducts in said set of ducts and arranged such that at any given time, a portion of said bores communicate with respective ones of said conduit means leading to said pistons in the power stage and another portion of said bores communicate with respective ones of said conduit means leading to said pistons in the return stage.

5. The motor of claim 1, further comprising
  a speed-change valve arranged in said shaft for controlling movement of said spindle in said closing valve and thus the flow of hydraulic fluid to said at least one piston space, and
  a duct arranged in said shaft substantially parallel to the orientation of said speed-change valve in said shaft and in fluid communication with said speed-change valve such that a control fluid is passed through said duct to said speed-change valve.

6. The motor of claim 5, wherein said speed-change valve includes a spindle and a spring for biasing said spindle against the pressure exerted by the control fluid.

7. The motor of claim 1, wherein said closing valve comprises a spring housing in which said spindle is situated and which defines a pressure-free space, further comprising a leakage line arranged in said shaft and communicating with said pressure-free space, said spindle having a first position in which the hydraulic fluid flows from said distributor valve to said at least one of said piston spaces and a second position in which the hydraulic fluid flows from said at least one of said pistons through said press-free space in said spindle to said leakage line.

8. The motor of claim 7, further comprising
an exchange-check valve, and
at least one speed-change valve fluidly coupled to said exchange-check valve, said exchange-check valve being structured and arranged such that the hydraulic fluid in the set of ducts having a higher pressure is passed through said exchange-check valve to said at least one speed-change valve, said at least one speed-check valve passing the hydraulic fluid into said spring housing of said closing valve to move said spindle.

9. The motor of claim 7, wherein a box space of the motor is defined between said cylinder frame and said box frame, further comprising
a directional valve,
a pressure-relief valve in fluid communication with said directional valve and said box space,
a spring-loaded check valve in fluid communication with said box space and said leakage line,
whereby when the hydraulic fluid passes through said directional valve to said pressure-relief valve and into said box space and from said box space through said spring-loaded check valve into said leakage line, the inward movement of said pistons in the return stage into said recesses is made quicker, and a difference in pressure is formed between said piston spaces and said box space such that the pressure in said box space is higher than the pressure in said piston spaces to ensured that said pistons remain in said recesses.

10. The motor of claim 9, further comprising
a check valve structured and arranged to ensure that a vacuum is not formed in said box space when said pistons are moved into said recesses.

11. The motor of claim 9, further comprising a flow regulation valve structured and arranged to enable fluid flow therethrough into said box space such that the fluid flow by-passes said distributor valve and said piston spaces when the motor is at a maximum volume per revolution.

12. A method for regulating a radial-piston hydraulic motor including a central shaft and at least one cylinder group, each of said at least one cylinder group comprising a cylinder frame including a plurality of radially oriented recesses and arranged in a stationary position in connection with said shaft, a box frame rotatably mounted to said cylinder frame, a cam ring having an inner, wave-shaped face arranged in connection with said box frame, piston mechanisms having a piston and a press wheel and arranged in said recesses in said cylinder frame such that a piston space is defined between said cylinder frame and each of said pistons, and conduit means for passing hydraulic fluid into said piston spaces such that said pistons are pressable against said wave-shaped face of said cam ring to cause said cam ring to revolve in relation to said at least one cylinder group, the improvement comprising the steps of:

connecting a distributor valve to said box frame for controlling flow of the hydraulic fluid to and from said piston spaces via said conduit means in order to selectively displace at least some of said pistons in a power stage outward against said cam ring causing said cam ring to rotate while enabling other of said pistons in a return stage to be displaced inward, arranging a set of ducts in said cylinder frame for passing the hydraulic fluid to said distributor valve, arranging a closing valve in said cylinder frame between said distributor valve and at least one of said piston spaces, said closing valve including a movable spindle structured and arranged to control the flow of hydraulic fluid to said at least one piston space independent of the flow of hydraulic fluid to other of said piston spaces, and fluidly connecting said distributor valve to said closing valve such the hydraulic fluid flows from said distributor valve through said closing valve to said at least one piston space.

* * * * *